United States Patent Office 3,700,465
Patented Oct. 24, 1972

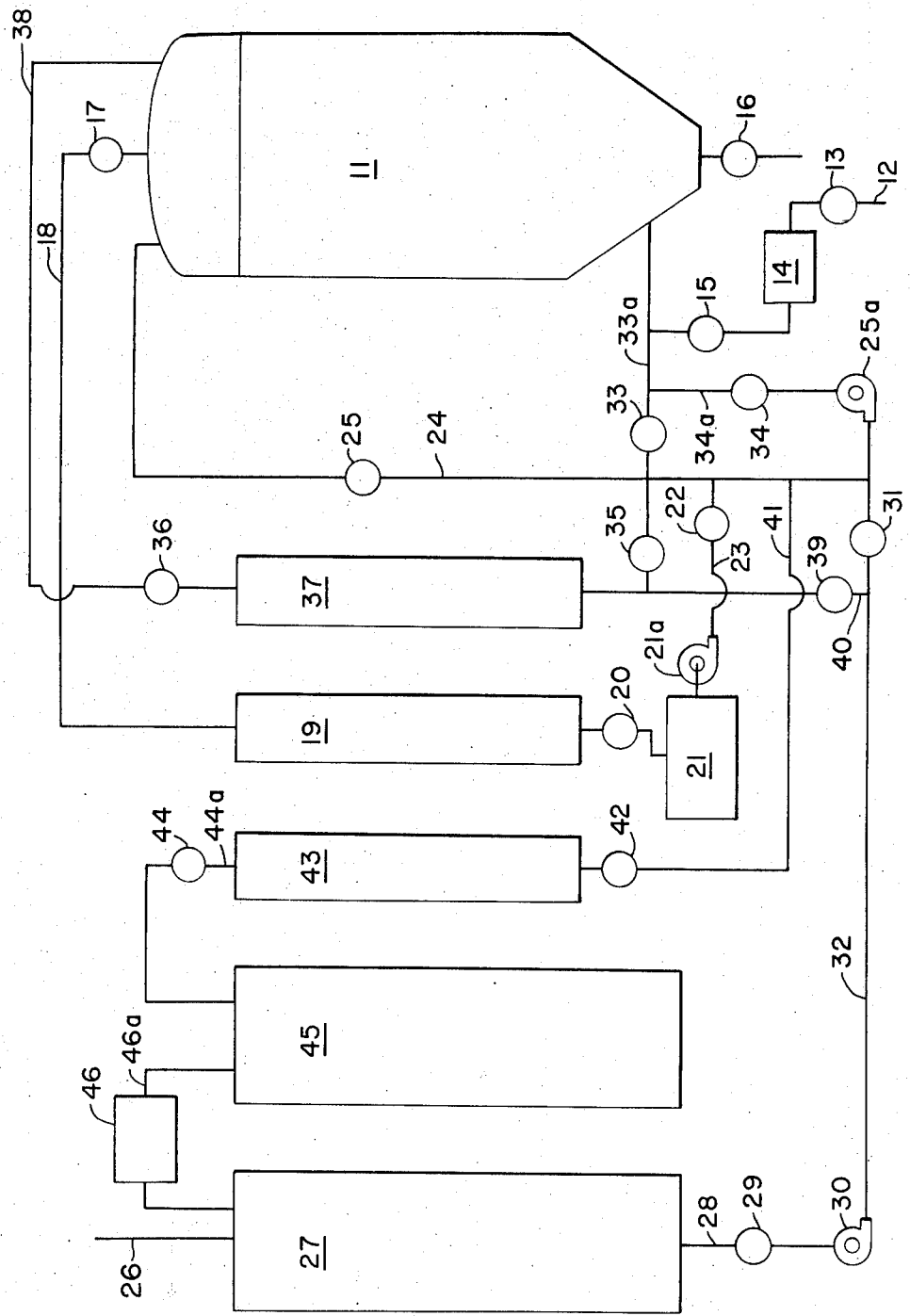

3,700,465
NONVACUUM DRYING OF DECAFFEINATED GREEN COFFEE BEANS
Benjamin Lawrence and Alan B. Wolfson, Springfield Township, Hamilton County, and Jayantilal M. Patel, Reading, Ohio, assignors to The Procter & Gamble Company, Cincinnati, Ohio
Continuation of abandoned application Ser. No. 23,648, Mar. 30, 1970. This application Feb. 23, 1971, Ser. No. 118,185
Int. Cl. A23f 1/10
U.S. Cl. 99—70
4 Claims

ABSTRACT OF THE DISCLOSURE

Drying times for decaffeinated green coffee beans are substantially reduced by drying green coffee beans in a nonvacuum dryer at bean surface temperatures of from 220° F. to 300° for from 15 minutes to 60 minutes.

CROSS REFERENCE

This application is a continuation of earlier-filed co-pending application, Ser. No. 23,648, filed Mar. 30, 1970 and now abandoned.

BACKGROUND OF THE INVENTION

In recent years the consumer market for decaffeinated coffees has substantially increased. Accordingly, a few commercial manufacturers in the United States are now selling decaffeinated coffee products. One of the major problems involved in preparing a decaffeinated coffee is the rather lengthy process times involved. For example, a typical decaffeination process beginning with green beans and resulting in decaffeinated green beans can and often does take from 31 to 43 hours and from 24 to 36 hours of this total process time is for the caffeine extracting step and from 4 to 10 hours is for the drying of the decaffeinated beans. Because of the lengthy process times involved, decaffeinated products are often substantially higher in cost than nondecaffeinated products.

Decaffeination using green coffee beans as a starting material and providing decaffeinated green coffee beans as the end product, typically involves five basic steps. These steps are steaming, pre-wetting, caffeine extracting solvent, stripping, and finally drying and cooling. These five basic steps are nearly as sold as decaffeination itself, and according to Sivetz, Coffee Processing Technology, 1963 Ed., Avi Publishing Company, vol. 2, page 207, these five steps have been practiced and well known since at least 1908. For literature disclosing these five basic process steps, see Sivetz, Coffee Processing Technology, vol. 2, page 207, U.S. Pat. 897,840, U.S. Pat. 936,392, U.S. Pat. 1,502,222, U.S. Pat. 1,957,358, and U.S. Pat. 1,977,416.

While disclosures relating to each of these basic steps can be found in the above-cited patents, in order to create the proper setting for applicants' invention, a brief description of each of these steps will be given herein.

Steaming.—In the steaming step, dry green coffee beans are steamed until the moisture contents of the beans is increased to within the range of from 16% to about 21%. Steaming times typically range from 1 to about 5 hours. During the steaming operation the cellular structure of the green coffee beans is softened and opened so that caffeine extraction can be more easily accomplished in subsequent steps. For further details releating to the basic steaming operation, see the above-cited Sivetz reference.

Pre-wetting.—During the pre-wetting step, water is added to the previously steamed green beans to increase the total moisture content to within the range of 30% to 40% by weight. The basic purpose of the pre-wetting procedure is to aid in the subsequent extraction of caffeine. For a detailed discussion of pre-wetting conditions, see Berry, U.S. Pat. 2,284,033.

Caffeine extracting.—During extracting, a chlorinated hydrocarbon solvent capable of extracting caffeine is contacted with the previously steamed and pre-wet green coffee beans. Typical chlorinated hydrocarbon solvents often employed are methylene chloride and trichloroethylene. Typically, the solvent and the beans are allowed to maintain contact at a temperature at or near the boiling point of the solvent for a time of from 24 to 36 hours. Of course, during this operation, spent solvent can continuously be replaced with fresh solvent. Alternatively, the same solvent can be utilized for the entire extraction operation. Extracting is continued until qualitative tests on spent solvent show the amount of caffeine contained in the solvent to be at the desired minimum level. For further details relating to solvent extraction of green coffee beans, see Weimer, U.S. Pat. 1,502,222 and Wilder U.S. Pat. 1,977,-416, and Wolfson et al., a concurrently filed co-pending, commonly assigned application, Ser. No. 118,183, which relates to decreasing caffeine extracting times by using increased solvent velocities and exchange rates, and Patel et al., Ser. No. 118,182, which relates to decreasing caffeine extracting times by using increased extracting temperatures and increased pre-wetting moisture, and Patel et al., Ser. No. 118,184, which relates to countercurrent caffeine extraction.

Solvent stripping.—Solvent stripping is usually accomplished by steam-stripping residual solvent from the decaffeinated green coffee beans which have previously been in contact with the caffeine-extracting solvent. Typically, steam is introduced into the extracting vessel at temperatures of from 212° F. to 240° F. and is continually passed over and through the previously extracted green beans until residual solvent can no longer be detected on the beans. Steam stripping can be conducted for from one up to twenty hours, but more typically is within the range of from one to eight hours. For details relating to the general process of steam stripping, see the above-cited references, and especially the Wilder reference.

Drying and cooling.—Subsequent to steam stripping, the beans are usually dried under vacuum at slightly elevated temperatures for a period of time ranging from four to ten hours. Thereafter the beans are cooled to room temperature and are then ready for subsequent roasting and conversion into a decaffeinated coffee product.

The process of this invention relates to the drying and cooling step.

SUMMARY OF THE INVENTION

This invention relates to an improved decaffeination procedure wherein green coffee beans are utilized as a starting material, and the end product is decaffeinated green coffee beans. More specifically, the invention relates to an improvement in a decaffeinating process wherein said process involves the steps of steaming green coffee beans, re-wetting the previously steamed coffee beans, caffeine extracting the previously steamed and pre-wet green coffee beans, solvent stripping residual solvent away from the green coffee beans, and drying and cooling the beans to provide decaffeinated green coffee beans, said process improvement relating to the drying and cooling step and comprising non-vacuum drying wet decaffeinated green coffee beans, within 1.5 hours after completing the solvent stripping step, at a bean surface temperature of from 220° F. to 300° F. for a time of from 15 minutes to 60 minutes.

BRIEF DESCRIPTION OF THE DRAWING

The figure is a flow chart showing one method of decaffeinating green coffee beans.

DETAILED DESCRIPTION OF THE INVENTION

Before describing in detail applicant's process improvements which relate specifically to the drying and cooling step, a brief description of an overall decaffeination process utilizing the flow chart of the drawing will be given herein. In the following description, unless specified to the contrary, all valves not specifically mentioned as open are closed.

Green coffee beans are charged into extractor 11 through an inlet opening not specifically shown on the drawing. Steam at a temperature of from 212° F. to 240° F. is introduced into the system through steam line 12 and passes through open valve 13 through separator 14 wherein condensate is trapped. Dry steam passes through separator 14 and continues on through open valve 15 and line 33a into the bottom of extractor 11. Steam is then passed in an upwards manner through the green coffee beans contained in extractor 11, and passes outward through open valve 17 and into line 18 leading to condenser 19 wherein the steam is condensed. The condensate passes through open valve 20 into separator 21 wherein it is collected and saved for subsequent use in the pre-wetting step, as hereinafter explained. During the steaming step, valve 16 remains partially open so that condensate forming on the beans and dropping to the bottom of extractor 11 can be removed and saved for use in pre-wetting, if desired.

Preferred steaming temperatures are from 220° F. to 230° F. and it is preferred that steaming continue until the toal moisture content of the beans ranges from 16% to 18% and preferably, 17%. Typically, it has been found that the moisture content of the beans is about 17% after steaming for from 15 minutes to one hour, usually about 30 minutes. This completes the steaming step.

After the above-described procedure, the cellular structure of the green coffee beans is softened and opened so that the caffeine contained in the beans can be more easily extracted during the hereinafter described extracting procedure.

Turning now to the pre-wetting step, wherein water is added to the previously steamed green beans to increase the moisture content to within the broad range of from 30% to 40% and to within the preferred range of from 32% to 38%.

The moisture addition of the pre-wetting step can be accomplished many different ways. With reference to the drawing, pre-wetting water from separator 21 can be added to the top of extractor 11 through centrifugal pump 21a, line 23, open valve 22, line 24 and open valve 25. Or, pre-wetting water may be added to the bottom of extractor 11 through open valve 33 and line 33a.

The amount of pre-wet water required to raise the moisture content of the beans in extractor 11 to the desired level is not sufficient to fill extractor 11, and since the next step in the decaffeination process is to extract with a solvent, all or part of the pre-wetting water may be added at the same time as the solvent. Fresh solvent, which has previously been placed in the fresh solvent storage tank 27 through fresh solvent line 26, drains into line 28, through open valve 29 and is pumped by centrifugal pump 30 through line 32 and open valve 31 into line 24 at the same time pre-wetting water is being pumped into line 24 as described above. The two liquids then pass together into extractor 11 either through line 24 and open valve 25 or through open valve 33 and line 33a or, if desired, simultaneously through both. In summary, there are many options for adding pre-wetting water; it can be added either at the top or bottom of extractor 11, or simultaneously at both top and bottom, and either separately from, together with, or partly separate and partly together with the fresh solvent. During the solvent addition operation valve 17 on line 18 remains open in order to vent air and solvent vapors which may form. Generally, however, the solvent and water, assuming they are added simultaneously through the bottom of extractor 11, are added at ambient conditions. It is preferred that sufficient solvent be added to provide a minimum solvent to bean weight ratio of 3:1, and preferably a ratio within the range of from 3:1 to 8:1, and most preferably a ratio of from 3:1 to 8:1, and most preferably ratio of from 3:1 to 5:1.

After the addition of the solvent and the pre-wetting water as previously described, the pre-wetting step is completed and the caffeine extracting procedure is ready to be accomplished. Caffeine extracting is accomplished. utilizing heated solvent at temperatures at or near the solvent boiling point, which for methylene chloride is about 105° F. at atmospheric pressure, and continuously circulating solvent in the manner hereinafter described to provide the maximum contact between solvent and beans. Prior to any solvent circulation through the entire system, the solvent contained in extractor 11 is heated by continuously circulating through heat exchanger 37 and into extractor 11 as follows: Valve 34 is opened and extracting solvent contained in extractor 11 drains into line 33a, 34 and pump 25a wherein it is pumped into line 24, through open valve 35 into heat exchanger 37. In heat exchanger 37 the solvent is heated to extracting temperatures, and then flows through open valve 36 on line 38 back into the top of extractor 11. The circulatory pumping of extracting solvent through heat exchanger 37, line 38 and into the top of extractor 11, out of the bottom of extractor 11 and back into heat exchanger 37 is continued until the extracting solvent has reached the desired temperature within the above-specified range. Usually it is preferred that heating be conducted for from 15 minutes to one hour, and preferably, for from 20 minutes to 40 minutes. After circulatory pumping and heating for times within the preferred time ranges, it has been found that the solvent has usually been increased to the required caffeine extracting temperature. After heating, the solvent is ready to begin continuous circulation for the required caffeine extracting time which usually ranges from 24 to 36 hours. During the extracting time fresh solvent is continuously fed into extractor 11 and spent solvent is continuously bled off from extractor 11 while simultaneously a recirculation of solvent is conducted. More specifically, with reference to the drawing, fresh solvent from solvent tank 27 passes down into line 28 through open valve 29 and is pumped by pump 30 into line 32, and because valve 31 is closed, passes into line 40 and through open valve 39 on line 40 into heat exchanger 37, wherein the temperature is raised to the required extracting temperature. Thereafter the solvent passes into line 38 through open valve 36 and back down into the top of extractor 11.

Simultaneously with the fresh input of solvent through line 38, spent solvent is removed from the bottom of extractor 11 through open valve 34 and passes through pump 25a into line 24. Because valve 25 on line 24 is partially closed, a portion of the solvent passes into line 41 through open valve 42 and into heat exchanger 43 wherein it is cooled and passes on into line 44a through open valve 44 and into spent solvent storage tank 45. Spent solvent storage tank 45 can be a distilling apparatus, in which case the spent solvent can continuously be distilled and passed into line 46a and through condenser 46 and back into fresh solvent tank 27. As previously mentioned, when withdrawing spent solvent from the bottom of extractor 11 through open valve 34, through pump 25a and into line 24, a portion of the spent solvent passes into line 41; however, because valve 25 on line 24 is only partially closed, a portion of the solvent is recirculated back into the top of extractor 11 through line 24. Recirculation, as just explained, controls the solvent superficial velocity. The solvent exchange rate is controlled by controlling the rate of fresh solvent input and the rate of spent solvent withdrawal.

During extracting the pressure employed is not critical; however, it must be sufficient to prevent vaporization of solvent. At temperatures near the solvent boiling point low pressures, i.e. 6–10 p.s.i.g., can be used; however, if higher extracting temperatures are employed, i.e. 150° F., and methylene chloride is the solvent, the pressure should be within the range of 30 to 200 p.s.i.g. and preferably 50 to 80 p.s.i.g.

After caffeine extracting for the required period of time, solvent is drained from extractor 11 and the now extracted green coffee beans are ready for stripping of residual solvent and subsequent drying and cooling.

Solvent stripping is conducted while the beans are still in extractor 11 and is conducted in the same manner as the steaming operation previously described with reference to the first step in the five basic steps of decaffeination. Solvent stripping is continued by steaming in the manner previously described for from one to eight hours, and preferably, one to two hours.

After solvent stripping by steaming, the beans are discharged from extractor 11 through a discharge line (not depicted in the drawing), and subsequently dried and cooled and ready for use in preparing a decaffeinated coffee product. Just prior to drying, the moisture content of the beans ranges from about 45% to about 55%. Conventionally, the beans are dried by a method such as vacuum drying at bean temperatures of from 120° F. to 240° F. for a period of time ranging from 4 to 10 hours. Usually the temperatures used are below 200° F. in order to insure flavor stability. When vacuum drying is employed, a typical vacuum is from 20 to 27 inches of mercury. Subsequently the beans are cooled by convection methods usually, an the decaffeinated green beans are then ready for subsequent roasting and conversion into a decaffeinated coffee product.

Roasting and grinding to provide a roast and ground decaffeinated coffee product can be done in conventional manners such as those described in Sivetz, vol. I, chapter 8. Alternatively, the roast and ground coffee can be utilized to prepare an instant coffee product by preparing an extract therefrom and subsequently drying the extract in manners taugh in Sivetz, vol. I, chapter 9, 10, and 13.

Turning now to the drying and cooling step wherein, as previously mentioned, applicants' improvement invention is practiced.

After steaming, pre-wetting, caffeine extracting, and solvent stripping, as described above, the moisture content of the wet decaffeinated green coffee beans ranges from about 45% to about 55%, and more normally, from about 48% to 51%. Conventionally, the beans have been dried by vacuum drying at bean temperatures of from 120° F. to 240° F. for from 4 to 10 hours at a vacuum of from 20 to 27 inches of mercury. Vacuum drying has generally been employed because heretofore it was thought that the higher temperatures needed to employ hot air drying or non-vacuum drying would destroy some of the valuable volatile flavor constituents contained in the decaffeinated green coffee beans. Therefore, prior art methods of drying wet decaffeinated coffee beans have painstakingly utilized vacuum methods, low temperatures, and long drying times in an effort to preserve and protect volatile flavor constituents contained in the decaffinated green coffee beans.

While utilization of vacuum drying gives satisfactory results from the standpoint of flavor of the resulting decaffeinated coffee, it is disadvantageous for two principal reasons, both relating to cost. First, utilization of vacuum drying equipment is expensive, and secondly, the utilization of lower temperatures, even when utilizing vacuum drying, of necessity involves lengthy drying times, i.e. from 4 to 10 hours as a typical example. Practicing the process of this invention when utilizing applicants' critical time and temperature ranges, allows the duplication of the flavor of vacuum-dried decaffeinated coffees, and because vacuum drying is not utilized, the total drying time is substantially decreased. Accordingly, the over-all cost of the process is substantially decreased.

It is essential to the drying procedure of this invention that the non-vacuum drying be employed for a period of time ranging from 15 minutes to 60 minutes, and preferably from 20 minutes to 35 minute at bean temperatures of from 220° F. to 300° F., and preferably from 240° F. to 260° F. If times longer than 60 minutes are employed, or temperatures are much is excess of 350° F., the coffee beans are not only dried, but the roasting process actually begins. This is of course undesirable in the event that the decaffeinated green coffee beans are to be sold to other coffee manufacturers for roasting utilizing their own blends and techniques. If times of less than 15 minutes are employed, the required temperature is higher than 300° F. and the beans begin to roast. Likewise, if temperatures less than 220° F. are employed, the drying time becomes so long that no particular advantage is gained over vacuum drying procedures.

The temperatures given herein with respect to applicants' wet bean drying process are temperatures of the *beans* during drying and not air temperature. In order to provide bean surface temperatures of from 200° F. to 300° F., typical hot air temperatures of from 300° F. to 375° F. are required. The temperatures are expressed as bean temperatures because bean temperature is the most common measure of drying and roasting temperature used by those skilled in the coffee art. This is so because bean temperature is more determinative than air temperature in regard to flavor effects produced.

With regard to pressure during drying, no special pressure conditions are necessary in practicing the non-vacuum drying process of this invention. Thus atmospheric pressure can be utilized as long as applicants' time-temperature ranges are utilized and a product having no flavor deterioration is produced. The fact that atmospheric pressure can be used is advantageous from a process cost standpoint.

The surprising feature of applicants' invention is that bean surface temperatures up to 300° F. can be employed to dry decaffeinated coffee beans from moisture contents ranging from 45% to 55% by weight down to moistures of from 8% to 9%, without deleteriously affecting the flavor of the decaffeinated coffee beans.

In order to insure that no undesirable flavor changes occur during the drying process of this invention, it is essential that the drying process of this invention be completed within 1.5 hours after completion of solvent stripping and preferably within 1.0 hour after solvent stripping. If drying is delayed longer than 1.5 hours after completion of solvent stripping, undesirable flavors develop which render the resulting beverage produced from the decaffeinated beans undesirable. Generally, there is no reason for delaying drying and it is preferred that drying be accomplished immediately upon completion of the solvent stripping step.

The nonvacuum drying of the previously decaffeinated wet green coffee beans can be accomplished in any of several well known nonvacuum dryers. Generally, nonvacuum dryers can be classified into the classes: fluidized bed dryers, hot air dryers, and fixed bed dryers. For reasons hereinafter explained, fluidized bed dryers are preferred when practicing the process of this invention. A fixed bed dryer refers to a drying apparatus which utilizes a stationary column of coffee beans through which hot air at the required drying temperatures is blown for a given period of time. For example, looking at the drawing, if hot air were blown through the beans contained in extractor 11 this drying method would be classified as a fixed bed drying procedure.

The phrase "hot air dryers" is intended to encompass what is generally known in the art as roasters. In hot air drying, coffee beans are continuously agitated and dried by tumbling in a hot air-containing chamber.

Fludized bed dryers are well known in the art and generally refer to dryers which blow hot air through a fluidized bed of the material to be dried. Typical fluidized bed dryers are a Jeffrey dryer and a Carrier dryer. In each of these instances, wet green coffee beans are conveyed onto an inclined vibrating plane at the end of highest elevation. The vibrating plane causes the beans to be agitated as they tumble down towards the end of the plane of lowest elevation. Simultaneously with passing downward along the vibrating plane, the beans are contacted with hot air at the required drying temperatures which is constantly being passed in an upwards manner through the vibrating plane. Fluidized bed drying is preferred because fluidized bed dryers are inexpensive and because drying can be accomplished in generally faster times. It is believed that fluidized bed drying is more efficient and economical for the reason that better heat transfer is obtained because each of the beans contained in the fluidized bed are individually dried as no constant contact surfaces between individual beans are maintained.

The process of this invention is illustrated, but not limited to, the following example.

Example 250 pounds of green coffee beans (225 pounds on a dry weight basis) comprising a blend consisting of Arabicas and Robustas is charged into extractor 11 through an inlet opening, not depicted on the drawing. Steam at a temperature of 230° F. is introduced into the system through steam line 12, passes through open valve 13, through separator 14 wherein condensate is trapped. Dry steam passes through separator 14 and continues through open valve 15 and line 33a into the bottom of extractor 11. Steam is continually passed in an upwards manner through the green coffee beans contained in extractor 11 of 0.5 hour. After passing through the green coffee beans, the steam passes out of extractor 11 through open valve 17 and into line 18 leading to condenser 19, wherein the steam is condensed. The condensate passes through open valve 20 and is collected in separator 21. During the steaming operation valve 16 remains partially open so that condensate forming on the green beans may be removed through valve 16. The total moisture content of the green beans after steaming at 230° F. for 0.5 hour is 17%. This completes the steaming step.

Turning now to the pre-wetting step, wherein the moisture content of the beans is adjusted to 42%. It was calculated that the required amount of water necessary to provide a moisture content of 42% by weight was 117 pounds.

The required pre-wetting water and methylene chloride solvent are added simultaneously in the following manner. Fresh methylene chloride solvent from fresh solvent tank 27 drains into line 28 through open valve 29 and is pumped by centrifugal pump 30 through open valve 31 on line 32 and into line 24, and because valve 25 is closed and valve 33 open, the fresh solvent passes through valve 33 and line 33a into the bottom of extractor 11. Simultaneously with the solvent addition just described, the pre-wetting water is added through separator 21, pump 21a into line 23 through open valve 22 on line 23, and in the same manner as the solvent through open valve 33 and line 33a into the bottom of extractor 11. Part of the pre-wetting water will consist of the condensate from the steaming step which has collected in the separator 21. The balance of the pre-wetting water is fresh water which is added through the separator for convenience. During this solvent and water addition, valve 17 on line 18 remains open in order to vent steam pressure which builds up. The solvent and pre-wetting water are added at ambient conditions. The flow rate of fresh solvent and pre-wetting water into extractor 11 is 2.5 gallons/minute. The total amount of solvent used in filling extractor 11 is 1000 pounds. The ratio of solvent to beans is 4:1. This completes the pre-wetting step.

The methylene chloride solvent contained in extractor 11 is heated by continuously circulating through heat exchanger 37 (wherein it is adjusted to a temperature of 150° F.) and through extractor 11. Circulation is accomplished by opening valve 34 and allowing methylene chloride solvent contained in extractor 11 to drain into centrifugal pump 25a wherein it is pumped at a rate of 8.5 gallons/minute into line 24, through open valve 35 and into heat exchanger 27 wherein the methylene chloride is heated to a temperature of 150° F. Thereafter the methylene chloride solvent passes through open valve 36 and into line 38 and back into the top extractor 11. Circulatory pumping of extracting solvent through heat exchanger 37 and into the top of extractor 11 and out of the bottom of extractor 11 and back into heat exchanger 37 is continued for 40 minutes until the solvent and bean temperatures are both 150° F. The pressure within the system is 80 p.s.i.g. After completing this initial heating step, fresh solvent is continuously circulated into extractor 11 and spent solvent is continuously bled off from extractor 11 at an exchange rate of 1 pound of solvent/pound of coffee/hour. Simultaneously, a small recirculation of spent solvent through line 24 and back into the top extractor 11 is conducted such that the solvent superficial velocity is 0.09 ft./minute.

With reference to the drawing, the solvent exchange rate and the solvent velocity are controlled in the following manner: Fresh solvent from tank 27 passes into line 28 through open valve 29 and is pumped by pump 30 at a rate of 2.25 gallon/minute into line 32 and because valve 31 is closed, passes into line 40 through open valve 39 and into heat exchanger 37 wherein the temperature is adjusted to 150° F., the desired extracting temperature. Thereafter the solvent passes into line 38 through open valve 36 and back into the top of extractor 11. Simultaneously with the fresh input of methylene chloride solvent through line 38, spent solvent is removed from the bottom of extractor 11 through lines 33a and 34a and open valve 34 at a rate of 8.5 gallons/minute. The spent solvent passes through pump 25a into line 24. Valve 25 on line 24 is partially closed, and therefore 25.5% of the spent solvent passes into line 41 through open valve 42 and into heat exchanger 43 wherein it is cooled and passes into line 44a through open valve 44, and into spent solvent storage tank 45. In tank 45 the solvent is distilled at 150° F. and passes into line 46a, through condenser 46 and back into fresh solvent tank 27. A majority portion (74.5%) of spent solvent passes through valve 25a on line 24 and is recirculated back into the top of extractor 11 at a solvent velocity of 0.2 ft./minute. After extracting for 12 hours at a temperature of 150° F., the extracting step is completed.

Thereafter, solvent stripping is conducted at temperatures within the range of 220° F.–230° F. for a time of 1.5 hours in the exact manner previously described in connection with the steaming step.

Thereafter, the wet decaffeinated green coffee beans are discharged from extractor 11 through a discharge line not depicted in the drawing. Two batches of wet decaffeined green coffee beans are obtained as described above. The first batch, comprising 250 pounds, was vacuum dried at a temperature of 150° F. for 3.5 hours. The vacuum drying pressure was 20 inches of mercury. Drying was begun immediately upon completion of solvent stripping. Subsequently the beans were cooled by exposure to ambient condition air currents, and utilized to prepare a roast and ground decaffeinated coffee product. In the roasting operations the 250 pounds of decaffeinated blended green coffee beans were roasted in a Jubilee roaster at an air temperature maintained within the range of 400° F. to 440° F. The end roast temperature was 440° F., and the total roast time was 12 minutes. The roasted beans were quenched with 5 gallons of water. Thereafter the blended, roasted decaffeinated coffee beans, which were dried by vacuum drying, were ground to regular grind size in a Gump grinder and labeled "Product A."

The remaining 250-pound portion of wet decaffeinated green coffee beans are dried in a non-vacuum fluidized bed Jeffrey dryer. Drying is commenced immediately upon completion of the solvent stripping step. The green beans are conveyed onto the upper inclined portion of the vibrating plane wherein they are fluidized and, because of the inclined position of the vibrating bed, are gradually conveyed downward to the bottom portion of the drying zone. During the entire fluidizing operation the residence time of each bean in the drying chamber is 30 minutes. Hot air is blown through the fluidized bed of green coffee beans at an air temperature of about 350° F. and the bean surface temperature was 250° F. The beans are cooled for 25 minutes to 80° F. using ambient air.

Thereafter the non-vacuum dried decaffeinated green coffee beans are roasted and ground as described above, and labeled "Product B."

A panel of five expert tasters prepares cups of coffee from the roast and ground decaffeinated products A and B by placing 7.2 grams of roast and ground decaffeinated coffee per cup of desired beverage, along with 178 ml. of water per cup of desired beverage in a conventional percolator and allowing it to perk until the temperature reached 180° F., at which time the coffee beverage is poured into cups to be tasted by the expert panel.

In evaluating the vacuum-dried product A, in comparison with the nonvacuum dried product B, the duo-trio comparison test is employed. In this test, the expert taster is allowed to taste three cups of coffee, one of which is identical to a standard cup of coffee. The expert taster then rates the amount of flavor deviation of each test cup of coffee relative to the standard cup. The cup of coffee differing in flavor from the standard is then assigned a numerical difference in flavor. In assigning magnitudes of difference in flavor, expert coffee panels use the following general scale:

.2—no difference
.3—very slight difference
.5—a difference is noted but is unable to be adequately defined
.8—very different from the standard and always discernible
1.2—maximum degree of variance from standard In making the due-trio comparison test described herein, the standard is product A and the two samples to be tested comprised one cup of beverage prepared from product A and one cup of beverage prepared from the nonvacuum dried product, B. The tasters did not know which of the test cups was identical to the standard, or which cup was prepared from vacuum and/or nonvacuum dried coffees. The following table summarizes the duo-trio flavor evaluation comparison test.

| Standard (Test A) | Test A (vacuum-dried) | Test B (nonvacuum dried) | Average difference | Word description |
|---|---|---|---|---|
| A | A | B | .2 | No difference. |
| A | A | B | .1 | Do. |
| A | A | B | .12 | Do. |

As can be seen, in each instance the flavor deviation was .2 or less. .2 is regarded as no difference at all, which indicates that the nonvacuum dried coffee prepared in accord with the process of this invention was equal in flavor with the vacuum-dried coffee which was prepared by more expensive, more time-consuming drying procedures not within the scope of the process of this invention and heretofore thought necessary for satisfactory flavor.

Substantially similar results are obtained when the fluidized bed dryer utilized in this example is replaced with a fixed bed dryer or a hot air dryer in that the resulting coffee beverage is substantially indistinguishable from coffee beverage prepared from vacuum-dried decaffeinated green coffee beans.

What is claimed is:

1. In a decaffeination process wherein said process involves the steps of steaming green coffee beans, pre-wetting the previously steamed green coffee beans, caffeine extracting the previously steamed and pre-wet green coffee beans, solvent stripping residual solvent away from the green coffee beans, and drying and cooling the beans to provide decaffeinated green coffee beans, the process improvement relating to the drying and cooling step comprising non-vacuum drying wet decaffeinated green coffee beans, within 1.5 hours after completing the solvent stripping step, at a bean surface temperature of from 220° F. to 300° F. for a time of from 15 minutes to 60 minutes.

2. The process of claim 1 wherein the time is from 25 minutes to 35 minutes.

3. The process of claim 1 wherein the temperature is from 240° F. to 260° F.

4. The process of claim 1 wherein the nonvacuum drying is conducted in a fluidized bed dryer.

References Cited

UNITED STATES PATENTS

| 1,977,416 | 10/1934 | Wilder | 99—70 |
| 3,106,470 | 10/1963 | Spotholz | 99—68 |
| 2,309,092 | 1/1943 | Berry et al. | 99—70 |
| 2,309,139 | 1/1943 | Rector | 99—70 |

FRANK W. LUTTER, Primary Examiner

W. L. MENTLIK, Assistant Examiner

U.S. Cl. X.R.

99—199